United States Patent [19]

Reum

[11] Patent Number: 5,117,583

[45] Date of Patent: Jun. 2, 1992

[54] LANDSCAPE TERRACING MATERIAL

[76] Inventor: Mark T. Reum, P.O. Box 170, Albany, Minn. 56307

[21] Appl. No.: 557,460

[22] Filed: Jul. 25, 1990

[51] Int. Cl.⁵ ............................................. A01G 1/00
[52] U.S. Cl. ........................................ 47/33; 52/102; 256/1; 256/19; 403/298; 403/292
[58] Field of Search ............... 47/33; 256/1, 19; 403/292, 298; 249/3-7; 52/102

[56] References Cited

U.S. PATENT DOCUMENTS

| | | | |
|---|---|---|---|
| 1,604,437 | 10/1926 | White | 52/738 |
| 2,745,165 | 5/1956 | Lewis | 249/3 |
| 3,472,133 | 10/1969 | Ziehm | 47/33 |
| 3,484,989 | 12/1969 | Lazinsky | 47/33 |
| 3,526,074 | 9/1970 | Miller | 52/731 |
| 3,788,001 | 1/1974 | Balfanz | 47/33 |
| 3,899,256 | 8/1975 | Matthews | 403/292 |
| 4,628,632 | 12/1986 | Zwier | 47/33 |
| 4,761,923 | 8/1988 | Reum | 52/102 |

FOREIGN PATENT DOCUMENTS

| | | | |
|---|---|---|---|
| 3023309 | 1/1982 | Fed. Rep. of Germany | 47/33 |
| 2289702 | 7/1976 | France | 403/298 |
| 2104993 | 3/1983 | United Kingdom | 403/292 |

*Primary Examiner*—Henry E. Raduazo
*Attorney, Agent, or Firm*—Merchant, Gould, Smith, Edell, Welter & Schmidt

[57] ABSTRACT

A landscape terracing material comprising a body member of predetermined length, height, and thickness dimensions having a first face and an opposing second face. A plurality of ribs to provide anchoring of the body member are constructed integrally with the body. The longitudinal ribs project from an opposing second face of the body member to provide an anchoring effect in terraced soil.

22 Claims, 3 Drawing Sheets

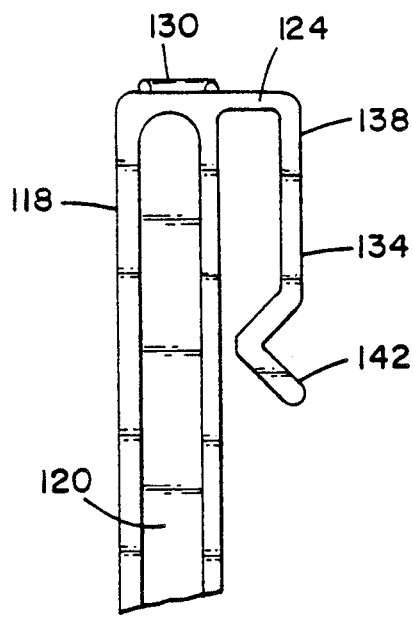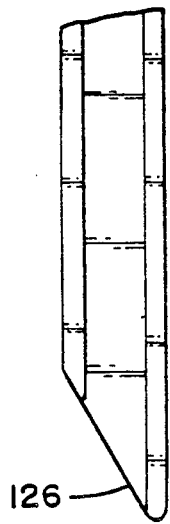
FIG. 4
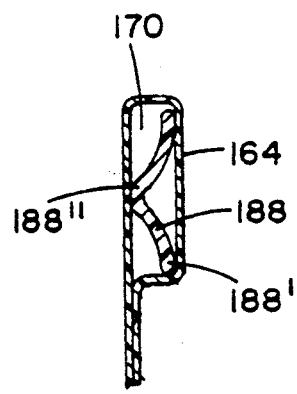
FIG. 8
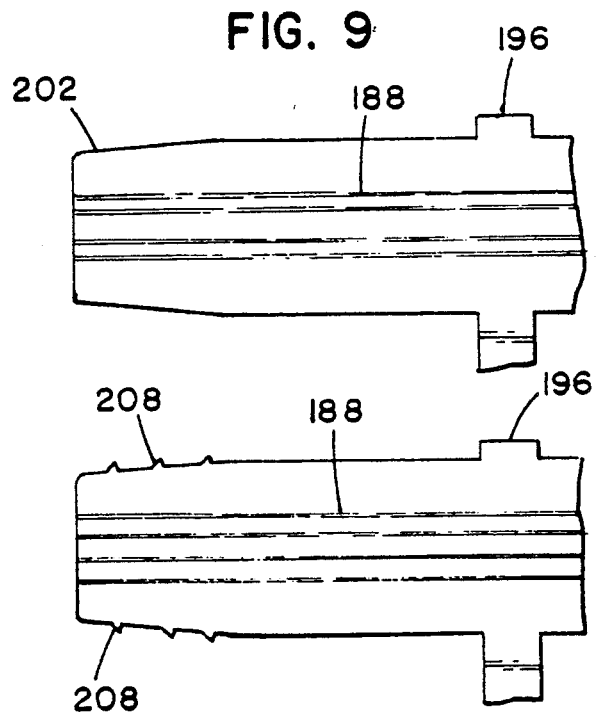
FIG. 9
FIG. 10

1

LANDSCAPE TERRACING MATERIAL

FIELD OF THE INVENTION

The present invention relates generally to a system of landscape terracing. More particularly, this invention concerns landscape terracing materials having improved anchoring ribs and terrace board holding features.

BACKGROUND OF THE INVENTION

Within the field of landscaping, it is often necessary to provide retaining walls for terraces. In particular, it is necessary to provide retaining wall material which supports a volume of soil to provide terracing for planting, prevention of erosion, aesthetic, or other landscaping purposes. Ideally, such landscaping wall material must combine the features of flexibility with strength. The flexibility permits installation and construction of the material so as to provide an undulating path for the terrace borders. However, it is necessary to provide a wall material for the terracing which will withstand the environmental punishment of intense sunshine, soil heating from frost, the pressure of a retained volume of soil, and other factors.

Various systems and structures exist for providing retaining walls of landscape terraces. Indeed, landscape terracing systems include wall members and stake members which are combined to support the terraced soil. Typically, the wall member may comprise an extruded plastic sheet material while the stake member is arranged for supporting the plastic sheet material and for pounding a portion of the stake into the soil proximate the area to be terraced.

Numerous problems exist in the known terracing systems. These problems include terracing material which becomes weak and which experiences structural breakdown from intense exposure to sunlight. Also, such sheet material may be constructed of such high strength plastic compositions that it becomes virtually non-compliant with respect to forming an aesthetically pleasing undulating path for the terrace. Known terracing sheet material is also prone to kinking and therefore cracking when arranged in a non-linear manner. Other problems with existing terrace systems include stakes which do not provide sufficient locking in the soil and therefore are rejected by frost heaves or other soil phenomenon; stakes which are often not ergonomically constructed thereby requiring double layers of terracing wall materials, extremely careful layout and arrangement for use; stakes which require extra care in handling, and other non-economic and non-user friendly considerations. Typically, such stakes may have components which are not efficiently arranged and therefore comprise excess weight during the shipping process. This weight consideration is also relevant to the terracing sheet materials which must also be constructed to accommodate the dual considerations of shipping weight and structural strength. What has been needed therefore has been a terracing system which comprises a strong yet efficiently constructed terracing sheet material and support member.

What has been further needed has been landscape terracing material comprising a body member having a lightweight yet durable construction with a positive lock anchor means comprising a plurality of longitudinal ribs for locking and gripping terraced soil.

What has been even further needed has been a landscape terracing system having a terracing body member with anchor means comprising longitudinal ribs and efficient stake means for supporting the terracing body member in a desired landscape location without concern for degradation of the terracing due to frost heaves in the soil.

What has been yet even further needed has been a landscape terracing system constructed and arranged in a durable and undulating pattern of aesthetically pleasing construction, the terracing material comprising a stake means having a snap-fit receipt capability for receiving a body member in snap-fit connection around an upper most rib on the body member.

What has been even further needed has been a landscape terracing system comprising a landscape terracing body member constructed for efficient connection with an adjacent landscape terracing body member.

Other objects and advantages of the invention will appear from the following detailed description which, in connection with the accompanying drawings, discloses embodiments of the invention for purposes of illustration only and not for determination of the limits of the invention.

SUMMARY OF THE INVENTION

Landscape terracing material is provided comprising a body member of predetermined length, height, and thickness dimensions. The body member comprises a first face and an opposing second face. Anchor means is included for holding the body member at a desired landscape location. The anchor means preferably comprises a plurality of longitudinal or horizontal ribs projecting from the body member second face.

BRIEF DESCRIPTION OF THE DRAWINGS

FIG. 4 is a side elevation view of a stake means according to the present invention.

FIG. 8 is a cross section view corresponding to lines 8—8 of FIG. 7 showing connector fingers configured within chambers of landscape terracing material ribs.

FIG. 9 is a top partial view of tapered connector fingers of connector means.

FIG. 10 is a top partial view of tapered barbed connector fingers of connector means.

DETAILED DESCRIPTION OF THE INVENTION

As required, detailed embodiments of the present invention are disclosed herein. It is to be understood, however, that the disclosed embodiments are merely exemplary of the invention which may be embodied in various forms. Therefore, specific structural and functional details disclosed herein are not to be interpreted as limiting, but rather as a basis for teaching one skilled in the art to variously employ the present invention in virtually any appropriately detailed system or structure.

Figure 1:
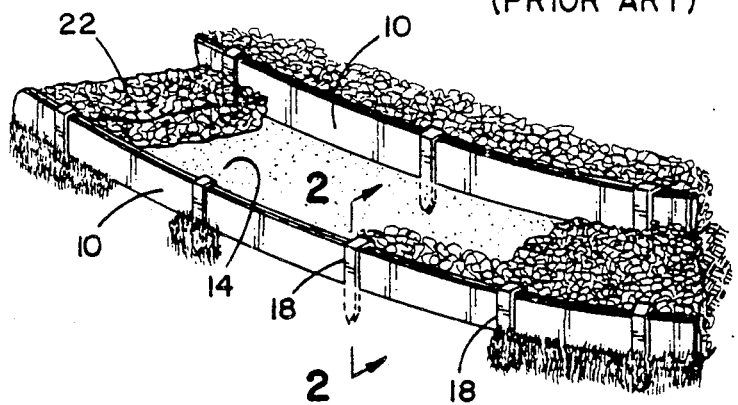
FIG. 1 is a perspective environmental illustration of a prior art terracing system.

Referring to FIG. 1, a prior art system for constructing terracing is shown. Such a representative prior art system comprises terracing sheet material 10 constructed and arranged for retaining and holding terraced soil 14. A stake member 18 is provided at various locations to support terracing sheet material 10.

Figure 2:
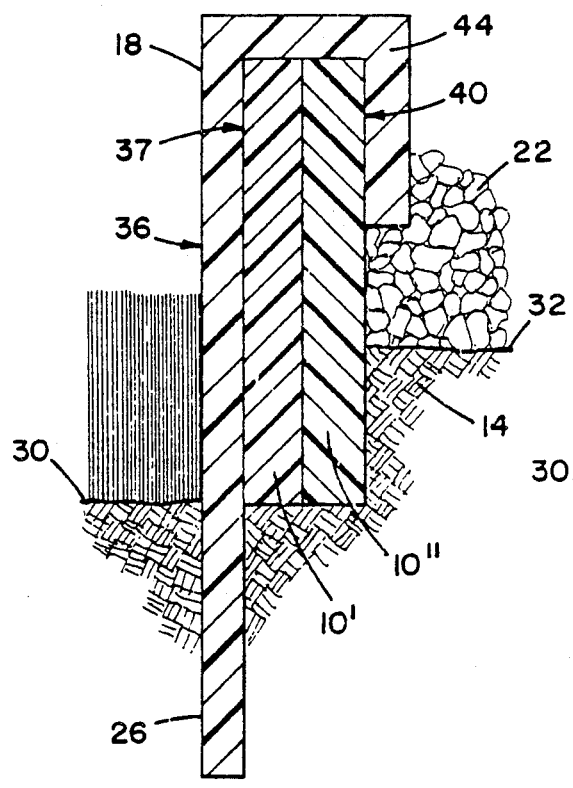
FIG. 2 is a side cross section elevation view corresponding generally to lines 2—2 of FIG. 1.

FIG. 2 illustrates a side sectional elevation view taken generally along lines 2—2 of FIG. 1. FIG. 2 illustrates a stake member 18 configured for retaining a terraced soil volume 14. Other debris, such as rocks or loose soil 22 may also be supported behind terracing sheet material layers 10', 10'' and stake member 18. A typical prior art installation of stake member 18 is illustrated in which a lower portion 26 is below ground to provide stability for stake member 18. A first lower terrace level 30 and a second upper terrace level 32 are illustrated. First lower terrace level 30 is proximate stake member front surface 36 and a front facing surface 37 of terracing sheet material 10'. Second upper terrace level 32 is supported behind stake member 18 and abuts against a rear facing surface 40 of terracing sheet material 10''. In addition, loose soil and debris 22 may also comprise an upper portion of second upper terrace level 32, in which case debris 22 may be piled against stake member 18 supporting flange 44 as well as terracing sheet material 10''.

Figure 3:
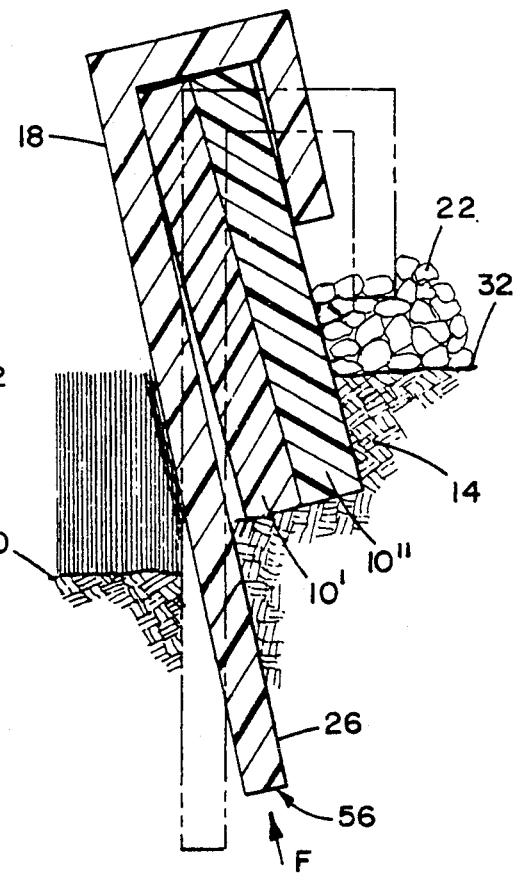
FIG. 3 is a side elevation cross sectional view corresponding generally to the prior art illustration in FIG. 2, but showing the disruption effect on the terrace stake and terrace sheet material due to frost heaves or other soil instability.

As is shown in FIGS. 1 and 2, this representative prior art terracing system is designed so that stake members 18 must have at least two sheets of terracing sheet material 10 (or 10', 10'') fitted between stake member supporting flange 44, stake member upper section 46, and stake member front pillar 48. This construction further requires that stake members 18 be used as connecting pieces between a plurality of terracing sheet materials 10. It is apparent, however, that such a connection system is both inefficient and poorly designed. In particular, such a system requires excess amounts of terracing sheet material 10 to be used in forming a terraced system. Moreover, greater rigidity results from pairing dual sheets of terracing sheet material 10, which may be undesirable when designing an aesthetically pleasing undulating pattern for terracing, or for other reasons. The above problems with prior art terracing systems are further complicated by soil disruptions which may generate force vectors, such as upward force vector F, which force stake members 18 from their original location in the soil. FIG. 3 illustrates the original placement location of stake member 18 in shadow, while simultaneously illustrating the location of stake member 18 following soil disruption such as a frost heave or the like. Typically, prior art stake members 18 experience force vector F against only a small area of stake lower portion 26, such as bottom surface 56. Without any counteracting force against representative force vector F, stake members 18 are dislodged from their original placement. This results in unsightly disconfiguration of a terracing system, and possibly even complete failure of the terracing system causing erosion and other damage to the landscape. In some cases, permanent damage to the terracing sheet material 10 or stake member 18 may also result, causing additional costly repairs for supplies in addition to any labor costs involved.

In order to overcome the above deficiencies of the prior art, as well as other deficiencies of known terracing systems, applicant has devised a novel stake member and novel landscape terracing material. First, stake member 118, shown in FIG. 4, comprises an elongate postportion 120 extending between an upper section 124 and a lower section 126. As shown, a preferred lower section 126 comprises a tapered lower section for ease in insertion in soil and to minimize any stake member disruption due to soil activity in the subsoil. A topping pad 130 is optionally provided to direct the force of hammer blows or the like along the theoretical longitudinal strength of elongate postportion 120. Topping pad 130 further encourages such hammer blows away from resilient spring clip portion 134. Resilient spring clip portion 134 preferably comprises a connecting upper portion 138 connected between stake member upper section 124 and resilient spring clip portion 134 resilient engaging end 142. As will be further discussed herein, stake member 118 is constructed for a snap-fit receipt of a terracing body member between elongate postportion 120 and resilient spring clip portion 134. Resilient spring clip portion 134 thus provides a snap-fit connection around a portion of a terracing body member to provide an easily assembled and positive lock connection in a preferred terracing system. Preferably, the snap-fit connection is with an uppermost rib of a construction hereinbelow described as a preferred body member construction.

Figure 5:
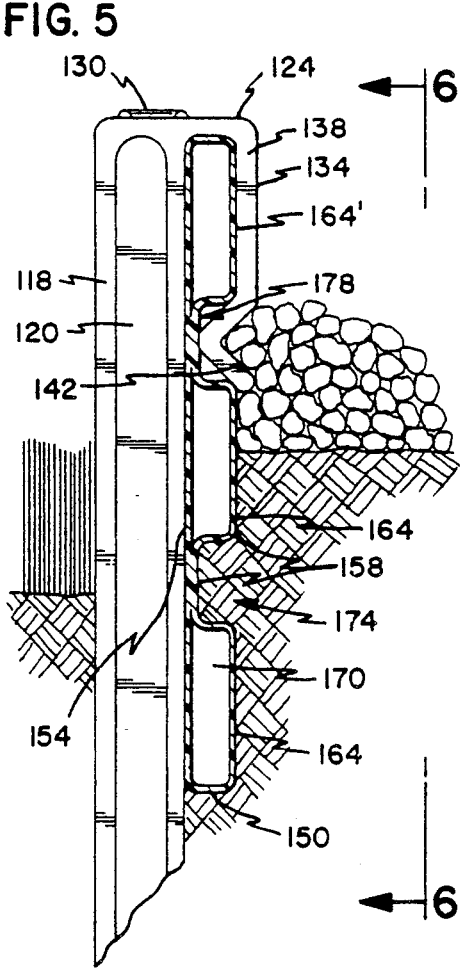
FIG. 5 is a side elevation view of a landscape terracing system according to the present invention.

FIG. 5 illustrates a preferred stake member 118 in use with a preferred terracing material body member 150. Preferred terracing body member 150 is efficiently constructed and has a predetermined length, height, and thickness dimensions. Body member 150 preferably comprises a first face 154, optionally configured in a substantially flat or planar arrangement, to ensure a snug fit against a supporting stake member 118, and to optimize the aesthetic qualities of the body member when used as landscape terracing support material. A body member second face 158 is configured substantially opposite body member first face 154. Body member 150 preferably comprises anchor means for holding the body member at a desired landscape location. Anchor means preferably comprises a plurality of longitudinal ribs 164, shown in representative vertical cross section in FIG. 5, projecting from and forming a nonplanar opposing second face 158. Preferred body member 150 is constructed of durable and weather resistant material. A preferred material is also impact resistant for greater longevity of the product. Such material may be manufactured of high density polyethylene, polypropylene, or a substance having similar characteristics. In order to achieve excellent manufacturing efficiencies and strength characteristics, it is desirable to use a material which is capable of extrusion. For example, a product according to this invention may be extruded using a tubing head and techniques such as vacuum calibration and plate series type of extrusion methods. The resulting product is illustrated in side elevation sectional view in FIG. 5 comprising a plurality of hollow profile longitudinal ribs 164. An extruded body member 150 may thus be cut to desired lengths, but may also be utilized in support of landscapes and soil terraces which require a strong yet durable and non-kinked supporting wall material. The novel structure of an integral body member 150 having a plurality of hollow profile ribs 164 provides such desirable characteristics.

Figure 6:
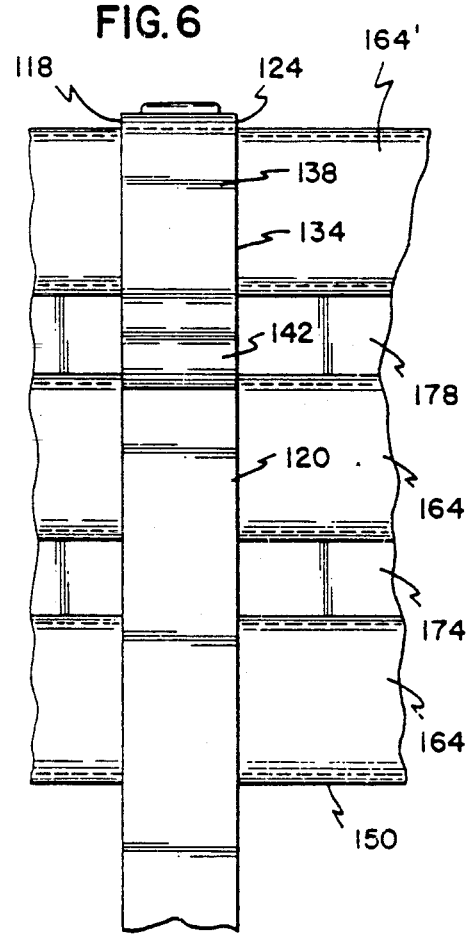
FIG. 6 is a front elevation view corresponding to lines 6—6 of FIG. 5 showing the terracing system according to the present invention.

A significant advantage of body member 150 over prior art terracing materials is the efficiently manufactured integral structure which also provides anchor means capability for anchoring body member 150 within subsoil substantially independent of soil disruptions such as frost heaves and the like. This is accomplished not merely by an associated stake means such as stake member 118, but in addition by forming the plurality of longitudinal chambers 170 internal to the body member wall portions of ribs 164. By vertically separating the internal longitudinal (or horizontal) chambers 170, spacing exists at locations represented in FIG. 5 at reference numerals 174 and 178. In the embodiment illustrated in FIG. 5, spacing location 174 provides for receipt of soil and other terraced material. Thus, any force tending to push body member 150 from a subsoil location may be offset by the weight or a counterforce exerted by soil within spacing location 174, thereby retaining body member 150 in its desired location relative to the terraced material. In other words, the provision of longitudinal ribs 164 in cooperation with spacing locations therebetween results in a soil anchor which tends to more effectively and efficiently retain a body member 150 in its desired soil location over known alternative structures. This of course is further assisted by a competently spaced and attached system of stake members 118. Now referring to FIGS. 5 and 6, a preferred body member 150 is shown in snap-fit connection with a preferred stake member 118. In particular, spring clip resilient engaging end 142 is shown in a snap-fit configuration within spacing location 178. This results in an uppermost portion of body member 150 comprising an upper most longitudinal rib 164, being surrounded and retained by resilient spring clip portion, stake member 118 upper section 124, and stake member elongate postportion 120. It is acknowledged that the precise shape of spring clip resilient engaging end 142 and ribs 164 may be modified within the scope of this invention provided that such modifications maintain the relative ease in connecting stake member 118 and body member 150 in a secure manner.

Yet another advantage of a preferred landscape terracing system according to the present invention includes a stake member 118 which is constructed and arranged for receipt of a single thickness of body member 150, rather than requiring a plurality of thicknesses of body member 150 such as illustrated in the representative prior art system shown in FIGS. 1–3. This results in considerable shipping and material savings of body member material, as well as providing more aesthetically pleasing terrace constructions. In order to achieve this single layer thickness advantage, connector means is provided for connecting two body members arranged in adjacent fashion.

Figure 7:
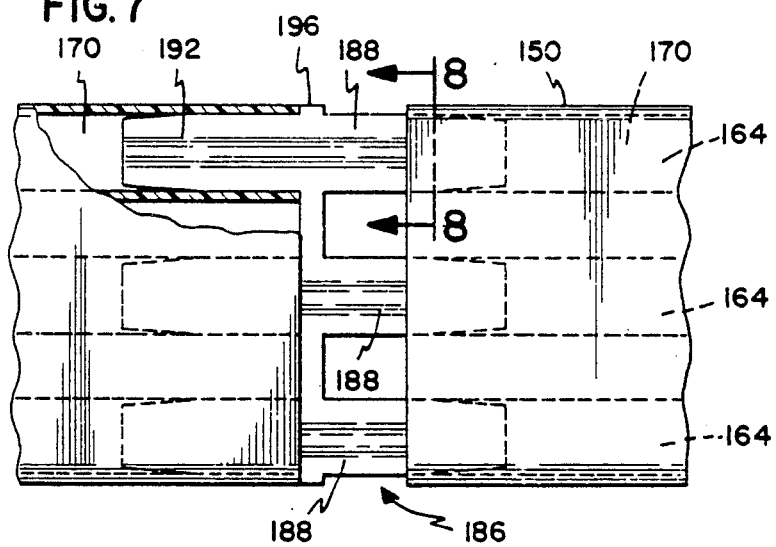
FIG. 7 is a partial cutaway view of two adjacent landscape terracing body members of the present invention configured for connection utilizing connector means.

Referring then to FIG. 7, one embodiment of connector means 186 is illustrated in the form of a plurality of connector fingers 188 and frame means 192 for supporting said plurality of connector fingers 188. Connector fingers 188 are preferably arranged for axial insertion into internal longitudinal chambers 170 formed by the wall portions of longitudinal ribs 164 of two adjacent body members 150. A friction fit connector means is preferable in that it provides a self-retaining connection between the surfaces of connector fingers 188 and the surfaces forming the inner walls of chambers 170. In this manner, connector means 186 facilitates assembly of longitudinally adjacent body members 150 to provide a continuous wall body member comprising a plurality of individual body members 150. FIG. 7 also illustrates frame means 192 comprising at least one centering rib 196 which provides means for centering connector fingers 188 within internal longitudinal chambers 170 of two connectable body members 150. Centering rib 196 also provides gap filling structure along a top portion of two body members 150 at a connection or assembly site. This further promotes the aesthetic qualities of the landscaped terracing system according to this invention as well as discouraging dirt, moisture, or other debris from entering into a gap between adjacent body members 150 which would result without use of such a centering rib 196.

FIG. 8 is a sectional representation corresponding generally to lines 8—8 of FIG. 7. FIG. 8 illustrates a portion of connector finger 188 configured within chamber 170 of longitudinal rib 164. Connector finger 188 is configured with opposing side edges 188' acting against a first inner face of walls forming chamber 170 and at least one raised ridge 188" configured between opposing side edges 188' and acting against a second inner surface of the walls forming chamber 170. The structure thus illustrated and described provides a biasing force against the inner surfaces of the walls forming chamber 170 to retain connector finger 188 therewithin. This aids in maintaining a closed connection between adjacent body members 150. In order to facilitate insertion of connector finger 188 into chamber 170, it may be desirable to provide tapering such as disclosed in FIG. 9. As illustrated, connector finger 188 comprises a tapered end section 202 to facilitate insertion thereof into chamber 170 as illustrated in FIGS. 7 and 8. It may be further preferable to provide protruding barbs 208 at selective portions of connector finger 188, as illustrated in FIG. 10. For example, a landscaped terracing system may provide connector means having connector fingers 188 which comprise protruding barbs 208 for selectively gripping wall surfaces defining internal longitudinal chambers 170.

What is provided therefor is a landscape terracing system which comprises features including a landscaped terracing body member having anchor means for holding the body member at a desired landscape location. The anchor means comprises a plurality of ribs which project from a face of body member 150. Stake means for supporting the body member in a desired landscape location are also provided. The present invention greatly enhances not only the aesthetic appeal of landscape terracing materials but also promotes greater opportunity for creating a non-linear or undulating path for the terrace supporting body member. This is important when considering the greater strength capabilities of such an undulating path rather than a long continuous straight wall terrace. By providing longitudinal ribs 164, the back filled soil comprising the terrace itself promotes an anchoring effect upon the body member 150. This encourages greater strength as well. The snap-in, snap-fit design of stake member 118 with body member 150 promotes greater terrace security as well as ease of use. This is particularly important when considering the multitude of design capabilities and needs for such material. It is acknowledged that stake member 118 may be further modified to include a dripline support, and body member 150 may also be modified to comprise ribs on both sides for special terracing needs. The employment of such longitudinal ribs in a terracing system promotes excellent strength characteristics while also reducing the weight normally experienced in a non-hollow system. In addition, the unique arrangement of longitudinal ribs 164 substantially eliminates the kinking and crackage problems associated with hollow terracing materials that do not have lateral reinforcements in contrast to the invention disclosed herein. Connector means is provided which includes bump stops or centering ribs 196 which prevent over-insertion of connector fingers 188 into adjacent body members 150, and which provides a smooth continuous appearance for the above-ground portion of adjacent body members 150. The friction fit ridged embodiment of a connector means, disclosed in FIG. 8 herein, permits wider tolerances in longitudinal rib manufacture and will thus compensate for any such tolerance differences from that which is desired. Accordingly, the efficient and advantageous construction of the present invention provides substantial improvements over prior art landscape terracing systems.

It is to be understood that while certain embodiments of the present invention have been illustrated and described, the invention is not to be limited to the specific forms or arrangements of parts described and shown above, since others skilled in the art may devise other embodiments still within the limits of the claims.

What is claimed is:

1. A landscape terracing material, comprising:
   a) a body member of predetermined length, height, and thickness dimensions having a first face, an opposing second face, and a top edge; and
   b) anchor means for holding said body member at a desired landscape location, said anchor means comprising a plurality of longitudinal ribs spaced from said top edge and projecting from said opposing second face, said ribs each including wall portions having inner surfaces defining an enclosed internal chamber, said ribs including a top surface to said wall portions for supporting terraced soil and other material disposed vertically above said top surface to anchor said body member.

2. Landscape terracing material according to claim 1 wherein said body member and said anchor means are integrally formed.

3. Landscape terracing material according to claim 1 wherein said body member is formed from an olefin.

4. Landscape terracing material according to claim 3 wherein the olefin is polyethylene.

5. Landscape terracing material according to claim 3 wherein the olefin is polypropylene.

6. Landscape terracing material according to claim 1 wherein said body member and said anchor means comprise integrally extruded material.

7. A landscape terracing system, comprising:
   a) a landscape terracing body member of predetermined length, height, and thickness dimensions having a substantially planar first face and an opposing second face;
   b) anchor means for holding said body member at a desired landscape location, said anchor means comprising a plurality of longitudinal ribs projecting from said opposing second face, each of said ribs including wall portions having inner surfaces defining an internal longitudinal chamber at each rib;
   c) stake means for supporting said body member in a desired landscape location; and
   d) connector means for connecting two of said body members, said connector means comprising frame means for supporting a first plurality of connector fingers projecting in a first direction, said frame means further supporting a second plurality of connector fingers projecting in an opposite direction, each of said connector fingers being constructed and arranged for axial insertion into said internal longitudinal chambers of said ribs of two adjacent body members.

8. A landscape terracing system according to claim 7 wherein said body member and said anchor means comprise integrally extruded material.

9. A landscape terracing system according to claim 7 wherein said stake means comprises an integral stake member, comprising:
   a) an elongate post portion with an upper section and a lower section;
   b) a head portion extending horizontally from said post portion upper section; and
   c) a resilient spring clip portion extending downwardly from said head portion;
   d) wherein said stake means is constructed for a snap fit receipt of said body member between said elongate post portion and said resilient spring clip portion with 10. A landscape terracing system according to claim 7 wherein said connector means connector fingers comprise tapered end sections.

11. A landscape terracing system according to claim 7 wherein said connector means connector fingers comprise protruding barbs for selectively gripping said wall surfaces defining said internal longitudinal chambers.

12. A landscape terracing system according to claim 7 wherein said connector means connector fingers each comprise at least one raised ridge for providing a biasing force against said inner surfaces defining said internal longitudinal chambers to retain said connector fingers within said internal longitudinal chambers.

13. A landscape terracing system according to claim 7 wherein said connector means comprises at least one centering rib protruding therefrom, said at least one centering rib providing means for centering said connector fingers within said internal longitudinal chambers of two connected body members and to provide gap filling structure along a top portion of said two body members at a connection site.

14. A landscape terracing system, comprising:
   a) a landscape terracing body member of predetermined length, height, and thickness dimensions having a first face and an opposing second face;
   b) a plurality of ribs projecting from said opposing second face; and c) stake means for supporting said body member in a desired landscape location, said stake means comprising:
      i) an elongate post portion with an upper section and a lower section and further defining a longitudinal vertical axis;
      ii) a head portion extending horizontally at said post portion upper section, said head portion including a force-receiving pad in axial alignment with said longitudinal vertical axis; and
      iii) a resilient spring clip portion extending outwardly and downwardly from said head portion, said resilient spring clip portion disposed away from said longitudinal vertical axis such that any force acting on said force receiving pad is substantially transmitted in a direction of said longitudinal vertical axis to said lower section and not through said resilient spring clip portion;

d) wherein said stake means is constructed for a snap fit receipt of said body member between said elongate post portion and said resilient spring clip portion with said resilient spring portion providing a snap fit connection around a rib of said body member.

15. A landscape terracing system according to claim 14 wherein said body member and said anchor means comprise integrally extruded material.

16. A landscape terracing system according to claim 14 wherein said ribs comprise wall portions having inner surfaces defining an internal longitudinal chamber.

17. A landscape terracing system according to claim 16 further comprising connector means for connecting a plurality of said body members, said connector means comprising frame means for supporting a plurality of connector fingers, each of said connector fingers being constructed and arranged for axial insertion into said internal longitudinal chambers of said ribs of two adjacent body members.

18. A landscape terracing system according to claim 17 wherein said connector fingers comprise tapered end sections.

19. A landscape terracing system according to claim 17 wherein said connector fingers comprise protruding barbs for selectively gripping said wall surfaces defining said internal longitudinal chambers.

20. A landscape terracing system according to claim 17 wherein said connector fingers each comprise at least one raised ridge for providing a biasing force against said inner surfaces defining said internal longitudinal chambers to retain said connector fingers within said internal chambers.

21. A landscape terracing material, comprising:
an extruded body member of predetermined length, height, and thickness dimensions having a substantially planar first wall and an opposing continuous second wall, said second wall defining a plurality of projecting ribs projecting away from said planar first wall, said projecting ribs defining hollow longitudinal chambers between said first wall and said second wall, said second wall joined to said first wall at regions between said projecting ribs, and wherein the thickness of said body member at said regions between said projecting ribs is equal to about a thickness of said first wall and a thickness of said second wall combined.

22. A landscape terracing material of claim 21, wherein said body member includes a top edge and a bottom edge, and wherein one of said projecting ribs forms said top edge of said body member and another of said projecting ribs forms said bottom edge of said body member.

* * * * *

UNITED STATES PATENT AND TRADEMARK OFFICE
CERTIFICATE OF CORRECTION

PATENT NO. : 5,117,583
DATED : June 2, 1992
INVENTOR(S) : Reum

It is certified that error appears in the above-identified patent and that said Letters Patent is hereby corrected as shown below:

```
Column 5, line 35
    DELETE "164" and INSERT therefor --164'--.

Column 8, line 24 (claim 9)
    INSERT --said resilient spring clip portion
    providing a snap fit connection with at least
    one of said ribs of said anchor means.-- after
    the word "with".
```

Signed and Sealed this

Ninth Day of November, 1993

Attest:

BRUCE LEHMAN

*Attesting Officer*     *Commissioner of Patents and Trademarks*